United States Patent

[11] 3,633,805

| [72] | Inventor | Luigi Vaghi<br>Via Gaffredo Mameli, 24, Lainate (Milano), Italy |
|---|---|---|
| [21] | Appl. No. | 88,145 |
| [22] | Filed | Dec. 2, 1969 |
| [45] | Patented | Jan. 11, 1972 |
| [32] | Priority | Dec. 5, 1968 |
| [33] | | Italy |
| [31] | | 24647 |

[54] DEVICE FOR FEEDING DIFFERENT GAUGE FILMS ON INDUSTRIAL EDITING AND SYNCHRONIZING TABLES
6 Claims, 4 Drawing Figs.

[52] U.S. Cl. .................................................. 226/76, 226/179, 226/110
[51] Int. Cl. ...................................................... G03b 1/24
[50] Field of Search .......................................... 226/76, 178, 188, 179, 110; 352/80

[56] References Cited
UNITED STATES PATENTS

| 1,972,555 | 9/1934 | Fear | 226/179 X |
| 2,419,474 | 4/1947 | Wilcox | 352/80 X |
| 3,111,249 | 11/1963 | Lazar | 352/80 X |
| 2,979,829 | 4/1961 | Uhleen | 226/179 UX |
| 3,240,116 | 3/1966 | Stamn | 352/80 X |
| 3,285,087 | 11/1966 | Wells | 226/76 X |

FOREIGN PATENTS

| 761,615 | 7/1949 | Germany | 226/179 |

*Primary Examiner*—Allen N. Knowles
*Attorney*—Littlepage, Quaintance, Wray and Aisenberg ABSTRACT: Device for feeding different gauge films on industrial editing and synchronizing tables, comprising a sprocket having two pairs of toothed crowns for drawing films of two different gauges, this sprocket being axially movable relative to a fixed body for causing a film, as drawn by one pair of crowns, or a film, as drawn by the other pair of crowns, to take a same distance relative to said fixed body, said sprocket automatically taking different speeds of rotation under the conditions where it is moved to different distances relative to said fixed body. The device also comprises a knob which can be rotated relative to the sprocket so as to make the latter idle on its rotational axis and, on continued rotation of the knob, so as to lock said sprocket relative to said fixed body.

INVENTOR.
LUIGI VAGHI

DEVICE FOR FEEDING DIFFERENT GAUGE FILMS ON INDUSTRIAL EDITING AND SYNCHRONIZING TABLES

This invention relates to a device for feeding different gauge films on industrial editing and synchronizing tables.

As known, in laboratories, movie and television studios, and other industrial studios, editing and synchronizing tables are used for editing, synchronizing and controlling films which may all be of a same gauge or different gauge from one another.

Editing and synchronizing tables have a work surface, a complete set of members projecting therefrom for film feeding, projection and sound reading; particularly, for each film there are provided a draw sprocket, rollers for guiding the film to a correct entry on said sprocket, so that the film perforation will coincide exactly at the level of the sprocket teeth, pressing members acting to prevent the film from being released from the teeth of the draw sprocket, particularly upon starting, running reversals and instant film halt, and a braking member acting on said sprocket.

On industrial editing and synchronizing tables one or more films may be simultaneously fed; four films may be fed simultaneously on further improved tables, which films may all be of a same gauge, that is 16 mm., 8 mm., 35 mm. or 70 mm., or may be of different gauges. Normally, films having two different gauges are fed on the editing table, and most frequently some of such films are of 16 mm. gauge and other films are of 35 mm. gauge. Where four films of a same gauge, such as 16 mm., or four films of a different gauge, such as 35 mm., or still some films of a gauge and other films of a different gauge may be simultaneously fed on an editing table, it is required that for each film two draw sprockets project from the work surface and, in the involved case, a draw sprocket for each 16 mm. film and a draw sprocket for each 35 mm. film, this meaning that eight sprockets should project from the work surface of the editing table, four of such sprockets being for 16 mm. film drawing and four for 35 mm. film drawing, with the capability of using simultaneously only four of these eight sprockets, while the other four sprockets are inoperative. In view of the foregoing, that is, guiding rollers, film pressing members and braking members are provided for each sprocket, it will be realized that the duplication of the draw sprockets and members associated therewith not only would help in raising the manufacturing cost for the device, but would also provide an overall size which is the cause of substantial restrictions in the apparatus performances, not enabling a ready handling of the films and often causing damages to the films being processed.

Attention should also be devoted that on the editing tables where films of different gauges are fed, the frames/second have to be the same both for films of a gauge and films of a different gauge: as a result, two films of a different gauge shall be fed by a different linear velocity on said editing table, this being achieved by rotating at different speeds the sprocket wheels for drawing the films of a gauge with respect to those for films of a different gauge.

It is also important to remark that in editing tables whereon films of a different gauge can be fed, such films should always have the lower edge thereof at a fixed height, that is at the same distance from the upper face of the table work surface. This condition is dictated in known editing tables by the provision of feeding members, collecting members and still other members of use by films of a different gauge.

Therefore, the basic object of the present invention is to provide a device applicable to editing and synchronizing tables for feeding films of different gauges, more particularly for feeding films of different gauges by different speeds depending on the film gauge, while maintaining, independently of the gauge, the lower edge of the film always at a fixed constant distance from the upper face of the table work surface carrying the device.

Another object is to provide a device for feeding films of different gauges, the device being provided with means by which it can be made idle about a vertical axis, or locked at a fixed position thereon, any rotational motion being prevented.

A still further object is to provide a device of a compact structure, reliable and comparatively easy to be obtained.

These and still further objects are attained by a device for feeding films of different gauges on industrial editing and synchronizing tables, comprising a first body member attachable below the work surface of one of said tables at a hole in said surface, a second hollow body member carried by the first body member and connected thereto by means preventing one body member from rotating relative to the other body member and enabling a longitudinal movement of the second body member relative to the first body member between raised and lowered positions defined by fixed stops, against which the second body member abuts at either position, an elongate shaft extending within the bore of the second body member, by which said shaft is supported by bearings affording a free rotation and preventing an axial movement relative to the second body member, a portion of said shaft projecting from the second body member above said work surface through the hole thereof, on this shaft portion a sprocket being mounted from which a pair of outer crowns project for a film drawing and at least one inner crown which is positioned between said outer crowns, the diameter of which being less than that of the outer crowns, for drawing a film of a lower gauge than that drawable by said pair of outer crowns, said stops against which the second body member abuts at said raised position and lowered position, respectively, causing a positioning for said pair of outer crowns and inner crown, respectively, such that the lower edge of a film, drawn by the pair of outer crowns under the conditions where the second body member and said shaft and sprocket therewith are at a raised position, is at the same distance from the upper face of the work surface as the lower edge of a film drawn by the pair of inner crowns under the conditions where the second body is at a lowered position, means being provided for imparting a different speed of rotation to said shaft under the conditions where said shaft along with the second body member is at a raised position and, respectively, under the conditions where said shaft along with the second body member is at a lowered position.

For a more clear understanding of the device structure and features, an embodiment thereof will now be described as given by mere way of example and not in a limiting sense, reference being had to the accompanying drawings in which.

Figure 1:
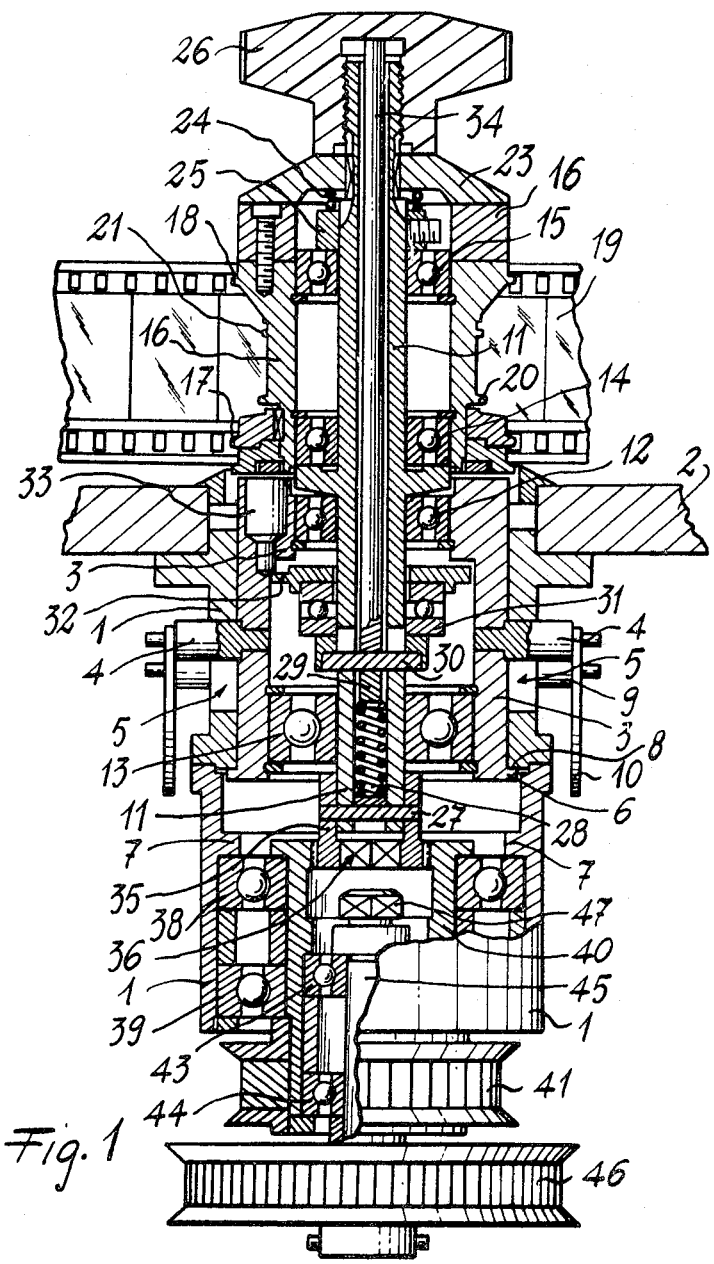
FIG. 1 is a longitudinal sectional view showing the device at the conditions for drawing a film.

The device, as shown in the drawings, comprises a first body member 1 formed of two hollow metal elements which are interconnected and attached to the work surface 2 of an editing table at a hole in said work surface. Particularly, it should be appreciated that said first body member 1 extends below the work surface 2.

A second hollow body member 3 is accommodated within the bore of the first body member 1 and two spokes project therefrom, each of said spokes 4 emerging from an elongate vertical slit 5 in body member 1, said spokes of body member 3 and slits of body member 1 forming a connection between said body members, by which the rotation of body member 3 relative to body member 1 is prevented, while affording the longitudinal movement of said body member 3 relative to body member 1.

Figure 2:
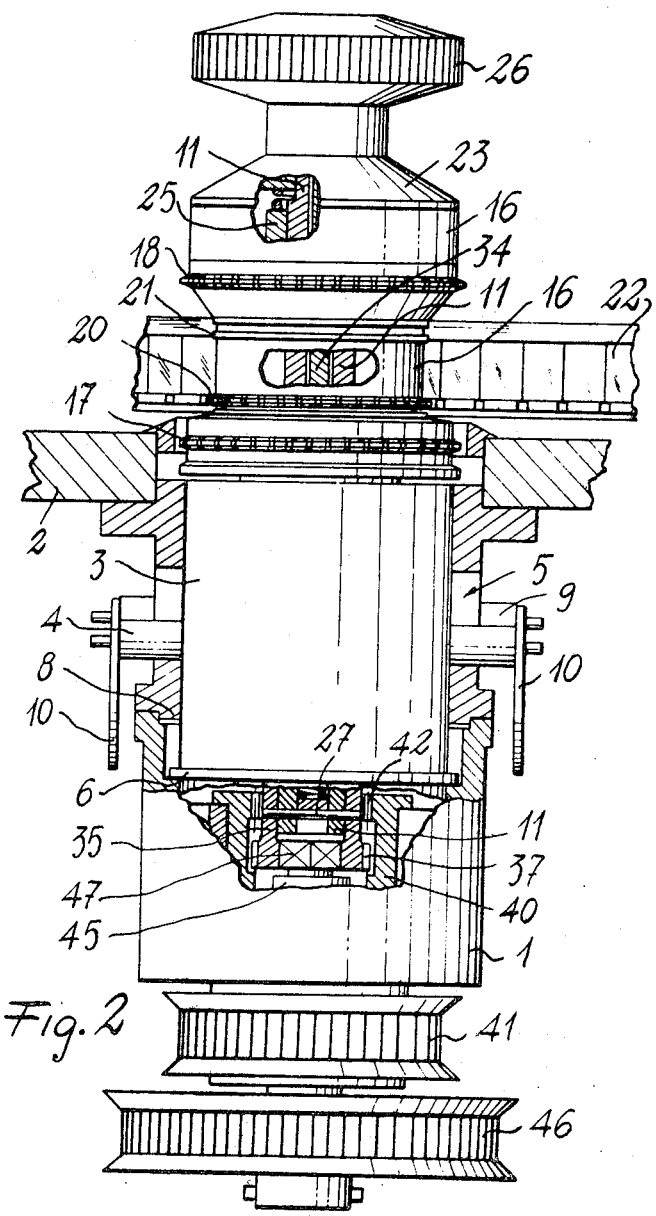
FIG. 2 is a partly sectional view of the device in FIG. 1 at the conditions for drawing a film of a different gauge from that drawn in FIG. 1.
Figure 3:
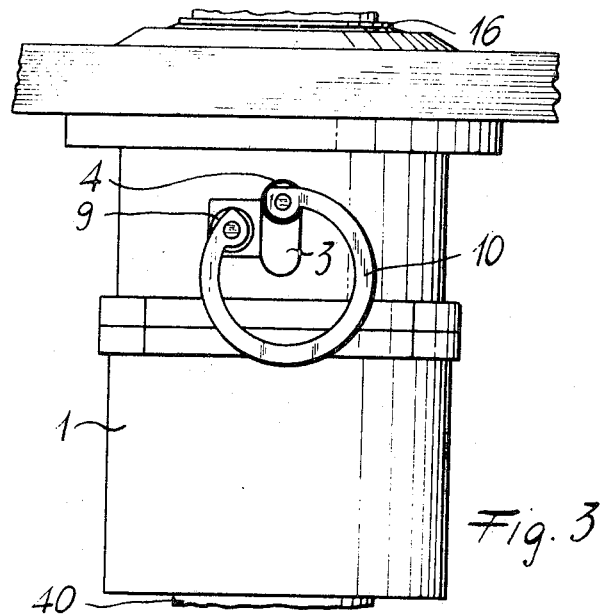
FIGS. 3 and 4 show at two different operative positions a detail of the device in FIGS. 1 and 2.
Figure 4:
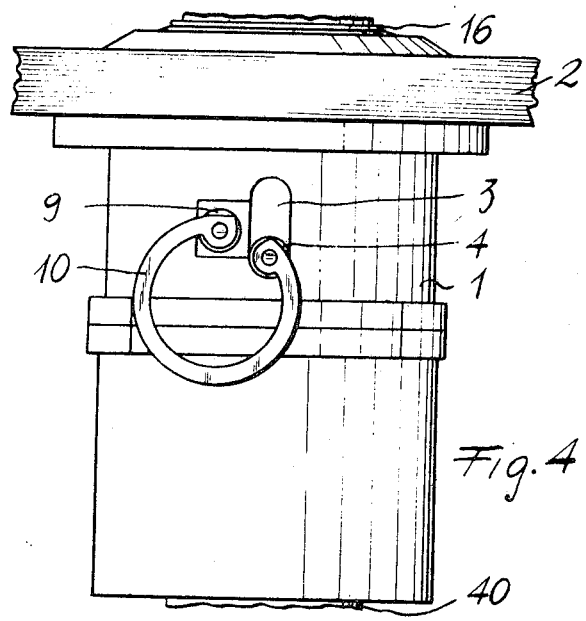

As shown in FIGS. 1 and 2, a flange 6 outwardly projects from the lower end of body member 3 and body member 1 is shaped above and below said flange to form two stops 7 and 8, respectively, against which flange 6 will abut when body member 3 is urged to a lowered position within the bore of body member 1 (FIG. 2) and, respectively, when body member 3 is moved to a raised position upwardly of body member 1 (FIG. 1). Further, two spokes 9 project from body member 1 adjacent slits 5 and on each pair of adjacent spokes 4 and 9 the ends of a preloaded, C-shaped spring 10 are mounted. As a result, when body member 3 is at a raised position (FIGS. 1 and 3), spring 10 tends to urge body member 3 upwardly of body member 1, or firmly holds said body member 3 at a raised position with flange 6 contacting stop 8. When body member 3 is urged downwards, as will be described below, as soon as spokes 4 reach a lower position than spokes 9, springs 10 will move and firmly hold body member 3 to a lowered position, that is with flange 6 contacting stop 7 (FIGS. 2 and 4).

An elongated shaft 11 extends within the bore of body members 1 and 3 and is carried from body member 3 by two bearings 12 and 13, respectively, allowing the free rotation of shaft 11 about its axis and restraining the axial displacements of shaft 11 and body member 3, or displacements perpendicular to the work surface.

As particularly shown in FIG. 1, a portion of shaft 11 projects from body member 3 above work surface 2 and thereon bearings 14 and 15 are mounted, on which a sprocket 16 is in turn freely rotatably carried, from which sprocket 16 a pair of outer crowns 17 and 18 project for drawing a film 19, such as a 35 mm. gauge film, as well as a pair of inner crowns 20 and 21 of a lower diameter than that of crowns 17 and 18 and serving to draw a film 22, such as a 16 mm. gauge film, that is a film of a lower gauge than that of film 19.

As particularly shown in FIG. 1, a ring 23 is mounted above said sprocket 16 and axially movable relative to shaft 11, but being prevented from rotating relative thereto: for instance, said ring 23 is connected to shaft 11 by a key which is movable within a longitudinal groove on the shaft. A spring 24 is provided below ring 23, the upper end of this spring abutting said ring and the lower end abutting a ring 25 which is attached to shaft 11, said spring 24 tending to urge ring 23 away from sprocket 16. The free upper end of shaft 11 has a thread which is engaged by the thread of a knob 26 which can be manually rotated relative to the shaft, so that when the knob is rotated in one direction, it will urge ring 23 on sprocket 16 overcoming the resistance of spring 24 and rendering said sprocket fast with ring 23, know 26 and, as a result, with shaft 11, thereby restraining said sprocket against rotation. This is the condition as shown in FIG. 1. When the knob is rotated on shaft 11 in opposite direction to said one direction, the knob is lifted upwards and therewith also ring 23, due to action of spring 24, until said ring 23 no longer contacts the upper face of sprocket 26 which, therefore, can freely rotate relative to shaft 11.

It is of immediate importance to point out that when body member 3 is at a raised position (FIG. 1), or flange 6 contacts stop 8, and, respectively, when body member 3 is at a lowered position, or flange 6 contacts stop 7 (FIG. 2), crowns 17 and 20, respectively, are positioned so that the lower edge of film 19 and, respectively, the lower edge of film 22, that is the lower edges of two films having a different gauge and drawable by sprocket 16, are at the same distance from the upper face of surface 2.

A piston pin 27 is fast with the lower end of shaft 11 and the lower end of a spring 28 abuts said piston pin 27, while the upper end thereof operates on a block 29, on which a piston pin 30 bears and extends through two elongated longitudinal grooves on shaft 11, as clearly shown in FIG. 1, the ends of which extending outwardly of said shaft and carrying a bearing 31 which at the top has a shaped plate 32 extending below the lower end of cylinders 33 (only one of which shown in the drawings) which are accommodated within seatings in body member 3. The upper ends of cylinders 33 are located just below the lower face of sprocket 16, so that, when knob 26 is screwed on shaft 11 to render sprocket 16 fast with said shaft, this knob will hold piston pin 30 downward urged by a rod 34 which is inserted in a longitudinal elongated bore in shaft 11 and abuts between said piston pin 30 and knob, downward pressing spring 28: under these conditions, plate 32 is at a lowered position and therewith also cylinders 33, not contacting sprocket 16. When knob 26 is unscrewed on shaft 11 in order to allow ring 23 to move away from sprocket 16, first said sprocket will be made idle relative to shaft 11, while rod 34, piston pin 30 and plate 32 are slightly upward lifted, and then, on continued unscrewing of knob 26, or movement of ring 23 away from sprocket 16 and upward lifting of rod 34 and piston pin 30 due to spring 28, by also lifting said plate 32 will interfere with the lower end of cylinders 33, upward lifting the same to contact the lower face of sprocket 16 which is thus braked and made fast with body member 3, that is any rotation of sprocket 16 on shaft 11 is prevented.

A bushing 35 is fast with the lower end of shaft 11 and at the shaft axis has a shaped seating 36, such as a square seating, while having a toothing 37 on its external periphery, as clearly shown in FIGS. 1 and 2.

At its lower end, body member 1 has bearings 38 and 39 freely rotatably carrying about its axis a hollow shaft 40, a toothed pulley 41 being fast with the lower end of said shaft projecting below body member 1, the upper end of which shaft has an inward projecting toothing 42, the latter being such that, when body member 3 and shaft 11 therewith is at a raised position (FIG. 1), it will engage toothing 37 of bushing 35 fast with shaft 11 which, therefore, is made rotatably fast with pulley 41.

Two bearings 43 and 44 are mounted within the hollow shaft 40 and support a shaft 45 freely rotatably about its axis, a toothed pulley 46 being fast with the lower end thereof projecting below pulley 41 and at upper end of which a head element 47 is provided and shaped so as to be accommodated within seating 36 of bushing 35, so that when body member 3 is lowered or moved downwardly of body member 1 (FIG. 2), toothing 37 will disengage from toothing 42, while seating 36 of bushing 35 overlies head element 47, so that shaft 11 is made rotatably fast with pulley 46.

Cog belts (not shown in the drawings) are wound on pulleys 41 and 46, respectively, and also are wound on further pulleys (not show) and are mounted on the shaft of an electric motor (also not shown), pulleys 41 and 46 causing shaft 40 and shaft 11, respectively, to rotate at speeds which are different from each other due to the different diameter of such pulleys.

From the foregoing it will be understood that, when knob 26 is screwed on shaft 11, making sprocket 16 fast with said shaft 11, and said knob is at a raised position, as well as sprocket 16 and body member 3 therewith (FIG. 1), said shaft 11 is rotatably driven by pulley 41, so that film 19 can be fed at a predetermined feeding speed.

When knob 26, and sprocket 16, body member 3 and shaft 11 therewith, are downward urged (FIG. 2) from the position as shown in FIG. 1, toothing 37 will disengage from toothing 42, while shaped head element 47 is inserted into shaped seating 36 and shaft 11 rotates with pulley 46; under these conditions, film 22, as drawn by crowns 20 and 21, is fed at a linear speed different from that at which film 19 is fed when mounted on the same sprocket 16 under the conditions where it is at a raised position, as above mentioned.

Accordingly, it will be appreciated that by the described device only one sprocket having an overlying knob will project above the upper face of work surface 2, this sprocket being for feeding two different gauge films, by retaining the lower edge of the two different films at a same distance above the work surface 2 and imparting to such films a different linear feeding speed depending on the gauge thereof and corresponding to the same amount of frames/second passing thereon, it being appreciated the easiness and rapidity in accommodating said sprocket 16 either films, by downward pushing or upward lifting said sprocket, respectively, thereby imparting automatically thereto a different speed of rotation.

It will also be appreciated the easiness in making said sprocket 16 idle on shaft 11 and the easiness and rapidity, as well, in locking said sprocket at a fixed position relative to the work surface, while allowing a free rotation for shaft 11.

At last, it should be noted that in an editing table for simultaneously drawing four distinct films, all of which may be of a same gauge or indifferently of two distinct different gauges, the use of only four devices, such as those herein shown, is sufficient to ensure the correct drawing for all of the four films independently of the gauge thereof, the fixed constant distance of the lower film edge from the face of the table work surface and to drive said films at the desired feeding linear speed. The device, also enclosing therein the brake means preventing the film draw sprocket from rotating, makes it possible to omit the ordinary brakes from the editing table.

Accordingly, the face of the work surface for a machine provided with the devices herein described is by far more cleared than that of the conventional work surfaces.

What is claimed is:

1. A device for feeding different gauge films on industrial editing and synchronizing tables, comprising a first body member attachable below the work surface of one of said tables at a hole in said surface, a second hollow body member carried by the first body member and connected thereto by means preventing one body member from rotating relative to the other body member and enabling a longitudinal movement of the second body member relative to the first body member between raised and lowered positions defined by fixed stops, against which the second body member abuts at either position, an elongated shaft extending within the bore of the second body member, from which said shaft is supported by bearings affording a free rotation and preventing an axial movement relative to the second body member, a portion of said shaft projecting from the second body member above said work surface through the hole thereof, on this shaft portion a sprocket being mounted from which a pair of outer crowns project for a film drawing and at least one inner crown which is positioned between said outer crowns, the diameter of which being less than that of the outer crowns, for drawing a film of a lower gauge than that drawable by said pair of outer crowns, said fixed stops, against which the second body member abuts at said raised position and lowered position, respectively, causing a positioning for said pair of outer crowns and inner crowns, respectively, such that the lower edge of a film, drawn by the pair of outer crowns under the conditions where the second body member and said shaft and sprocket therewith are at a raised position, is at the same distance from the upper face of the work surface as the lower edge of a film drawn by the pair of inner crowns under the conditions where the second body member is at a lowered position, means being provided for imparting a different speed of rotation to said shaft under the conditions where said shaft along with the second body member is at a raised position and, respectively, under the conditions where said shaft along with the second body member is at a lowered position.

2. A device according to claim 1, wherein said sprocket is carried on said shaft portion by bearings enabling a free rotation relative to the shaft, and the free upper end of said shaft has a thread which is engaged by the thread of a knob operable to rotate relative to the shaft to be moved to said sprocket to make it fast with said knob and shaft and, respectively, to be moved away from said sprocket to make it freely rotatable relative to said shaft.

3. A device according to claim 2, wherein said shaft is internally hollow and a rod is accommodated therein, said knob abutting the upper end of said rod, the lower end of which abuts a piston pin which is downward urged to said knob by a spring also accommodated within the bore of said shaft, said piston pin emerging from said shaft through two longitudinal slits in said shaft and by its ends emerging from the shaft carrying a bearing which carries a plate extending below the lower end of at least one cylinder accommodated within a seating in said second hollow body member, said cylinder extending to the lower end of said sprocket on which the cylinder abuts as urged by said plate, under the conditions where said knob is rotated on said shaft in the direction of being moved away from said sprocket.

4. A device according to claim 3, wherein said means for imparting a different speed of rotation to said shaft comprise first and second pulleys fast with first and second shafts, respectively, freely rotatable to each other and still freely rotatably carried by said first body member, said first shaft having a shaped head extending to a correspondingly shaped seating at the lower end of said shaft carried by said second body member, said second shaft having a toothing engageable with a corresponding toothing at the lower end of the shaft carried by the second body member, the positioning of said toothings, head and shaped seating being such that said toothings are brought to be interengaged and said head is out of said seating and, respectively, said toothings are clear of interengagement and said head is accommodated within said seating, under the conditions where said second body member is at raised and lowered positions, respectively.

5. A device according to claim 4, wherein resilient means are provided for holding said second body member at a steady lowered and raised positions, respectively, relative to said first body member.

6. A device according to claim 5, wherein a ring is placed between said knob and upper face of said sprocket, said ring being restrained against rotation on said shaft and freely movable thereon, a spring abutting said ring and acting thereon to urge it away from said sprocket.

* * * * *